United States Patent [19]
Thomson

[11] 3,764,205
[45] Oct. 9, 1973

[54] SINGLE FRAME ADVANCE MECHANISM FOR MOVIE PROJECTORS

[75] Inventor: Kenneth William Thomson, Rochester, N.Y.

[73] Assignee: Eastman Kodak Company, Rochester, N.Y.

[22] Filed: Sept. 12, 1972

[21] Appl. No.: 288,446

[52] U.S. Cl. ............................ 352/169, 352/191
[51] Int. Cl. ................................ G03b 21/38
[58] Field of Search .............. 352/137, 169, 168, 352/180, 191

[56] References Cited
UNITED STATES PATENTS
3,533,688  10/1970  Painton .................. 352/137 X
1,943,303  1/1934  Foster .................... 352/169 X Primary Examiner—Monroe H. Hayes
Attorney—W. H. J. Kline et al.

[57] ABSTRACT

An improved intermittent film transport for a motion picture projector includes a film claw adapted to periodically engage and advance a film strip and a single frame advance mechanism for restraining the film claw from engaging the film until the mechanism is selectively actuated by the operator. When actuated, the mechanism is effective to release the film claw and permit it to advance the film by a single image frame before the claw is again intercepted and restrained.

6 Claims, 3 Drawing Figures

PATENTED OCT 9 1973 3,764,205

SINGLE FRAME ADVANCE MECHANISM FOR MOVIE PROJECTORS

CROSS REFERENCE TO RELATED APPLICATION

Reference is made to commonly assigned copending U.S. Pat. application Ser. No. 250,263 entitled, "TWO FRAMES PER SECOND DEFEAT MECHANISM" filed May 4, 1972 in the name of J. J. Bundschuh.

BACKGROUND OF THE INVENTION

1. Field Of The Invention

This invention relates generally to web handling apparatus such as a motion picture projector which has a film claw driven to engage and advance a film strip, and more particularly to a single frame advance mechanism for causing the film claw in a motion picture projector to engage and advance the film strip by a single image frame each time the mechanism is actuated.

2. Description Of The Prior Art

An improved slow motion projection mechanism has been described in commonly assigned U.S. Pat. Application Ser. No. 250,263 entitled, "TWO FRAMES PER SECOND DEFEAT MECHANISM" filed May 4, 1972 in the name of J. J. Bundschuh wherein the film claw of the mechanism can be periodically restrained from engaging and advancing a received film strip. Such a defeat mechanism is suitable to provide very slow projection speeds (e.g., 2 frames per second), but in certain instances it is desirable to provide for stop frame projection and to permit the operator to selectively advance a film by a single frame to permit viewing of greater detail. While known mechanisms are suitable to provide stop frame viewing, the defeat mechanism disclosed in the Bundschuh application is especially suitable for use with the improved single frame advance mechanism of the present invention.

SUMMARY OF THE INVENTION

It is an object of this invention to provide an improved motion picture projector mechanism for effecting stop frame projection.

It is another object of the present invention to provide an improved film claw control mechanism for a motion picture projector which permits the film claw to engage and advance a film strip at a normal rate (e.g., 18 or 24 frames per second) or, alternatively, by a single image frame.

It is a further object of the present invention to provide an improved motion picture projector mechanism for causing a film claw to engage a film strip to selectively advance the film by a single image frame.

According to a preferred embodiment of the invention, an improved film transport mechanism for a motion picture projector includes a mechanism for selectively restraining the film claw from being driven into contact with the film strip. The single frame advance mechanism prevents the film claw from being driven by the in-and-out cam of the projector until the operator actuates a manual control, thereby permitting the operator to selectively advance the film to permit stop frame viewing.

The invention and its objects and advantages will become more apparent from the detailed description of the preferred embodiment of the invention presented below.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

The embodiment of the present invention shown in the accompanying drawings and discussed herein is especially suitable for use with the projector embodiments disclosed in detail in the afore-mentioned, commonly-assigned copending U.S. Pat. application Ser. No. 250,263 filed in the name of J. J. Bundschuh wherein a slow motion defeat mechanism is provided for a motion picture projector having a single film claw for one type of film or having two film claws which are selectively operable for either super 8 or regular 8 motion picture films.

Figure 1:
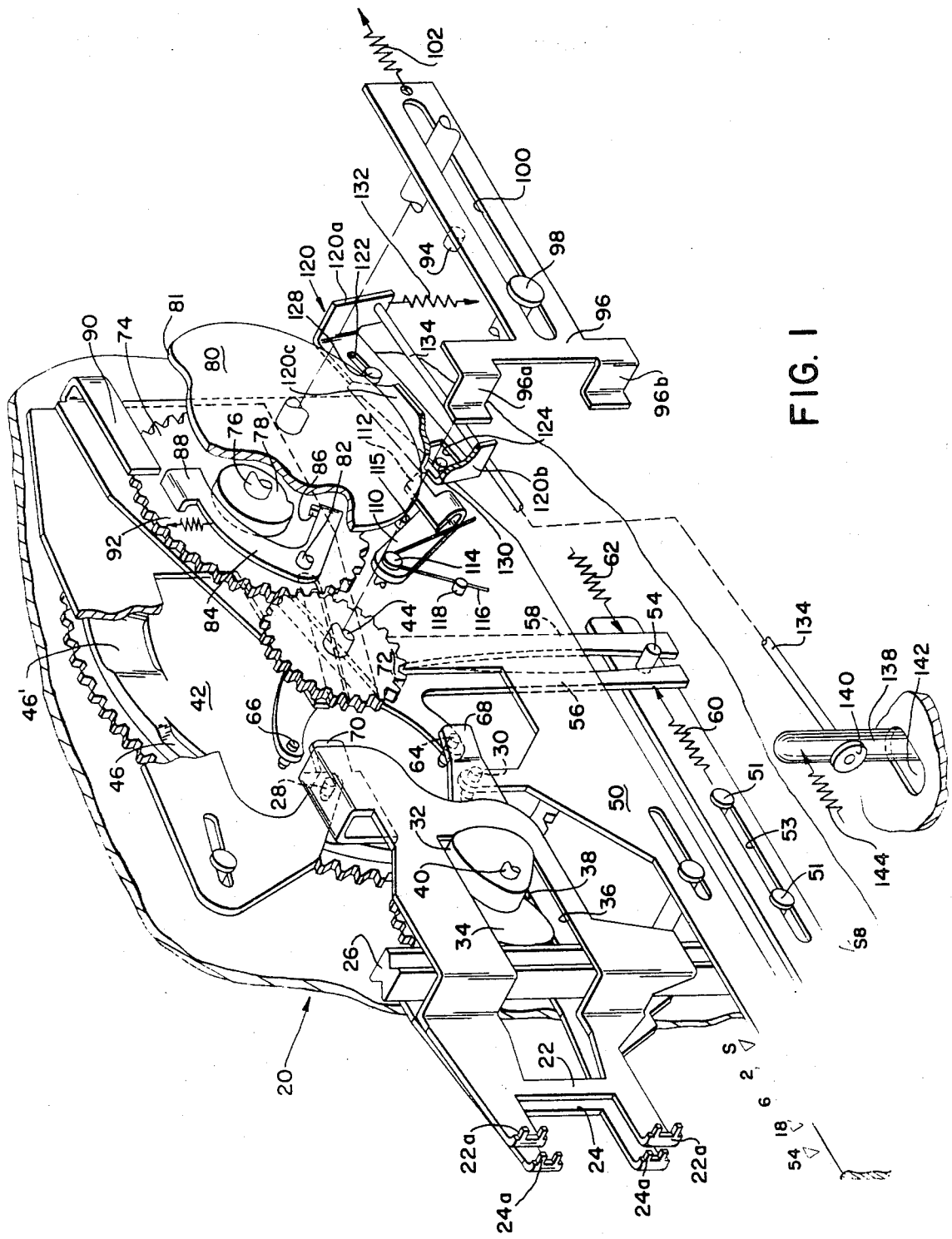
FIG. 1 is a perspective view, partially exploded, of a preferred embodiment of a single frame advance mechanism according to the invention which is adapted to cooperate with the transport mechanism of a motion picture projector.
Figure 2:
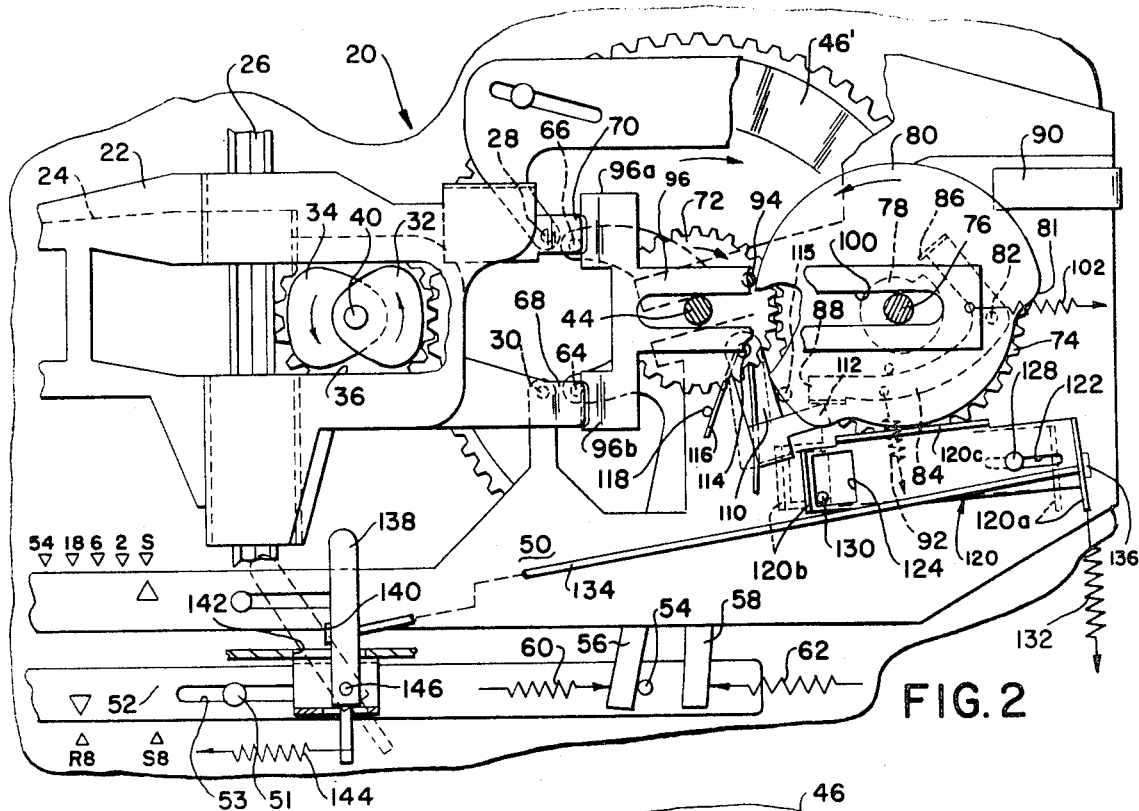
FIG. 2 is a side view of the embodiment shown in FIG. 1 showing in phantom the movement of the control linkage of the invention which causes advancement of the film by a single image frame.
Figure 3:
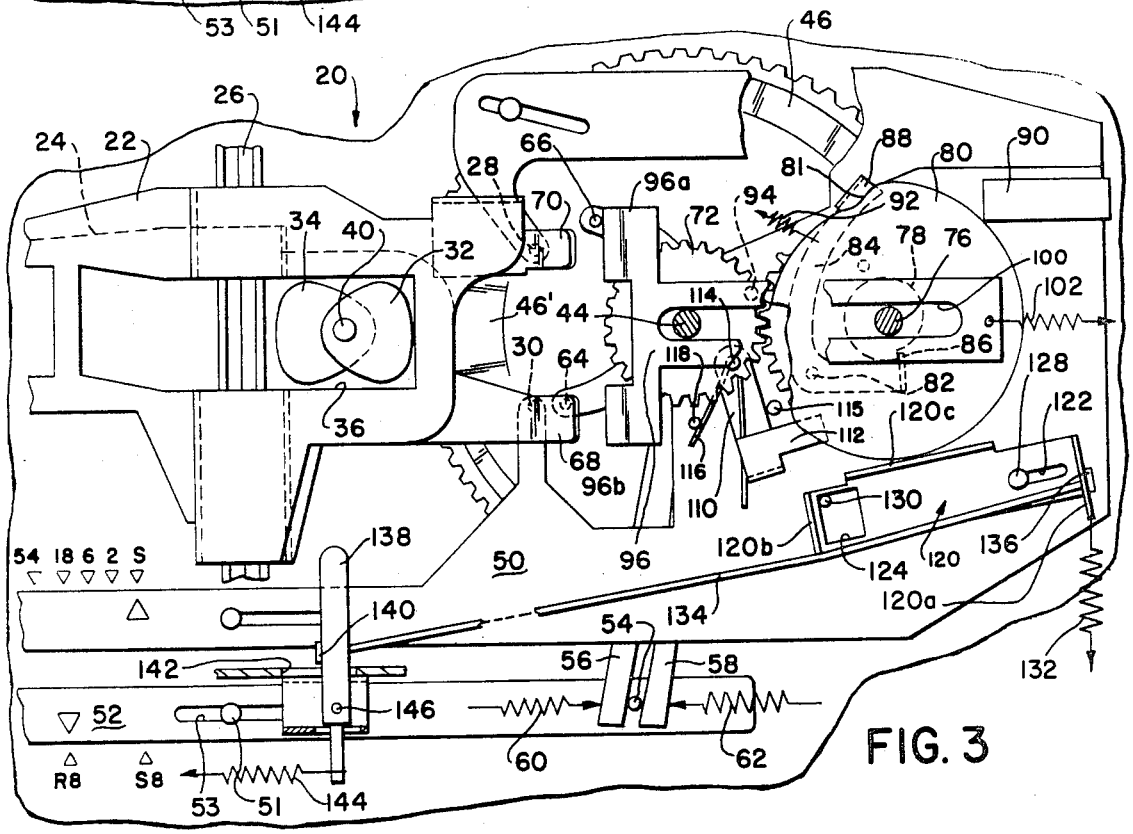
FIG. 3 is a side view of the embodiment shown in FIG. 1 showing the projector mechanism in an operative position and the single frame advance mechanism in position to disable the film claw of the projector.

Referring now to the drawings, FIGS. 1 through 3 show a projector mechanism 20 which includes claw arms 22 and 24, each having pairs of claw teeth 22a and 24a respectively, for engaging different film types. Claw arms 22 and 24 are mounted to move up and down and also to pivot in and out relative to the film gate (not shown) of the projector by use of any suitable pivot arrangement, as for example, the ball and race structure 26 which is described in detail in commonly-assigned U.S. Pat. No. 3,402,006 entitled, "MOTION PICTURE PROJECTOR" issued in the name of J. J. Bundschuh et al. on Sept. 17, 1968, the disclosure of which is incorporated herein by this reference. Claw arms 22 and 24 are both normally urged in a counter-clockwise direction about pivot 26 by biasing members (not shown) such that the claw teeth 22a and 24a are urged toward the film strip whenever in-and-out cam followers 28 and 30 pass into indentations on the face of a cam 42 as will be described in detail later.

The up-and-down movement of the claw arms 22 and 24 is under the control of up-and-down or pull-down cams 32 and 34 respectively, which are secured to a drive shaft 40 and are embraced by follower surfaces 36 and 38 of claw arms 22 and 24 respectively. As is well known, each revolution of up-and-down cams 32 and 34 is effective to produce one complete reciprocal stroke of film claws 22 and 24. Thus, as described in the aforementioned Bundschuh et al. U.S. Pat. No. 3,402,006 where shaft 40 is typically driven at 54 revolutions per second, claws 22 and 24 are both caused to reciprocate in the up-and-down or film advancing direction at a rate of 54 strokes per second.

At the same time that the claws 22 and 24 are reciprocally driven in the film advancing direction, one of the claws can be selectively driven in and out or in the film engaging and disengaging direction while a film selector lever or film slide 52 effectively restrains the other claw from engaging the film in a manner which will be described in greater detail later. The unrestrained claw is driven by a cam mechanism which is also well known. A radial or face cam 42 is secured to a shaft 44 which is rotatably mounted in the projector substantially parallel with the drive shaft 40 and is driven in synchronism therewith by known means, such as a gear drive. As best shown in FIG. 1, the face cam 42 is provided with a plurality of groups of depressions or indentations 46, 46' (and others not shown) which have various radial dimensions and are spaced circumferentially about the face of cam 42. As described in commonly assigned U.S. Pat. No. 3,261,654 issued in the name of Faber et al. on July 19, 1966, these indentations cooperate with cam followers 28 and 30 to cause the pairs of claw teeth 22a and 24a respectively, to be moved into and out of engagement with a film strip at various frequencies so as to achieve various predetermined projection speeds, such as 54, 18 and 6 frames per second.

As best seen in FIG. 1, film slide 52 is slidably mounted on the projector housing in any suitable manner such as by rivets 51 which pass through an elongate slot 53 in the slide and are secured to the projector. A shaft 54 is secured to slide 52 for moving control arms 56 and 58 as slide 52 is moved. Control arms 56 and 58 are both pivotably mounted about shaft 44 and are resiliently urged into contact with the shaft 54 by springs 60 and 62 respectively.

Extending from control arm 56 is a stud shaft 64 which is engageable with tab portion 68 of the film claw 24. Stud shaft 68 is effective to drive claw 24 in a clockwise direction about the pivot 26 and holding the claw from moving in the film engaging direction whenever slide 52 is positioned at the R8 position for regular 8 operation. (FIG. 1 position). Similarly, a stud shaft 66 extends from control arm 58 for contacting tab 70 of film claw 22 and for preventing the claw arm 22 from engaging the film strip when slide 52 is moved to the right to the indicates S8 or super 8 position. Movement of slide 52 from the regular 8 to the super 8 position would also allow spring 60 to urge control arm 56 in a counterclockwise direction about shaft 44 thereby removing stud shaft 64 from contact with tab 68 and allowing film claw 24 to resume being driven for engaging and advancing film in response to in-and-out cam follower 30.

The projector mechanism shown in FIGS. 1 through 3 also includes a speed or speed slide 50 which may be moved to any of several predetermined locations before or during operation of the projector to determine the projection speed. As is well known in the motion picture art, movement of slide 50 causes cam followers 28 and 30 to be shifted and positioned along the face of in-and-out cam 42 such that the cam followers are in alignment with different ones of the groups of depressions 46, 46'. As face cam 42 is rotated, the claw arm which is unrestrained is then urged to follow the inward movements of cam follower 28 or 30 as previously explained. The resulting in-and-out motion of the claw arm allows the film to be engaged and advanced as the claw is also being moved up-and-down in synchronous relation by the up-and-down cam.

To provide projection speeds which correspond to less than one advancement of the film per revolution of cam 42, the projector mechanism shown in FIGS. 1 through 3 includes a defeat mechanism of the type which is fully disclosed in the aforementioned Bundschuh application, but will now be briefly discussed to aid in understanding of the embodiment of the present invention.

As best shown in FIG. 1, a pinion 72 is secured to a shaft 44 adjacent to slide member 50. Pinion 72 drives a gear 74 which is secured to shaft 76 and since pinion 72 has one-third as many teeth as gear 74, gear 74 and shaft 76 are necessarily driven at one-third the speed of shaft 44. Thus, where shaft 44 is typically driven at a speed of 6 revolutions per second, shaft 76 is driven at 2 revolutions per second.

A ratchet member 78 is secured to shaft 76 closely adjacent to gear 74 and could be integral therewith. A cam 80 is rotatably mounted about shaft 76 in a position closely adjacent to ratchet member 78. Eccentrically secured to the inner surface of cam 80 is a pivot shaft 82 which extends over the outermost surface of ratchet member 78. A pawl 84 is pivotally mounted on shaft 82 between cam 80 and gear 74. Pawl 84 includes a first end portion 86 which is positionable for engaging ratchet member 78 and a second end portion 88 which is positionable for contacting a bent-off tab portion 90 of slide member 50 as will be explained in greater detail.

A spring 92 urges pawl 84 in a counterclockwise direction about shaft 82 such that end portion 86 is brought into engagement with ratchet member 78 whenever slide 50 is positioned to the positions shown in FIGS. 1 through 3 wherein end portion 88 does not contact tab portion 90 of slide 50. That is, when slide 50 is positioned for single frame operation, as shown in FIGS. 2 and 3, or two frames per second operation, as shown in FIG. 1, end portion 88 can no longer contact tab 90 and spring 92 then urges pawl 84 to pivot about shaft 82 until the end 86 of pawl 84 is operatively engaged with ratchet 78. When pawl 84 is thus engaged with ratchet 78, the cam 80 is effectively coupled through pawl 84 to shaft 86 and caused to rotate as if it were itself secured to shaft 76. That is, the rotational force applied to ratchet 78 is transmitted by pawl 84 to shaft 82 which in turn causes cam 80 to be driven by shaft 76 as if those members were a single unit being driven at 2 revolutions per second in the preferred embodiment. Spring 92 is effective to hold pawl 84 into engagement with ratchet 78 until slide member 50 is again moved to the left for operation at 54, 18 or 6 frames per second whereupon tab 90 once again is brought into contact with end portion 88 causing pawl 84 to be held disengaged from ratchet 78.

A plate 96 which is bifurcated at one end to form extensions 96a and 96b, is slidably secured to the projector by a rivet 98 and is mounted about shaft 76 which passes through an elongated opening 100 in the plate. Secured to the central portion of plate 96 is a shaft 94 which is maintained in contact with surface 81 of cam 80 by a spring 102 which is secured to both the plate and the projector in any known manner.

As disclosed in the aforementioned Bundschuh application, shaft 94 is effective to follow the contour of cam surface 81 as cam 80 is rotated and to overcome the force of spring 102 to drive plate 96 to the left as shown in FIGS. 3. When plate 96 is moved to this position, extensions 96a and 96b are in contact with stud shafts 64 and 66 causing the claw arms 22 and 24 to be restrained by the engagement of these shafts with tabs 68 and 70. Cam surface 81 is effective to hold plate 96 in this position for approximately 240° of rotation and thereby restrain the claw arms 22 and 24. As the cam 80 continues to rotate, shaft 94 continues to follow along the contour of cam surface 81 and passes into an indented portion thereof, as seen in FIG. 3, allowing spring 102 to again move the plate 96 to the right and allowing extensions 96a and 96b to be removed from contact with stud shafts 64 and 66 approximately 80° of rotation of cam 80. The effect of movement of stud shafts 64 and 66 into and out of contact with the tabs 68 and 70 once per revolution of cam 80 is to allow an unrestrained film claw to follow the movement of the in-and-out cam follower only once for every third revolution of the in-and-out cam 42. That is, for every six revolutions of in-and-out face cam 42, cam 80 rotates twice and allows a film claw to be urged by its cam follower into engagement with the film only twice. Thus, this defeat mechanism is effective to provide advancement of the film at a rate of two frames per second.

The projector mechanism shown in the drawings also includes a preferred embodiment of a single frame advance mechanism for cooperating with the previously discussed defeat mechanism to permit the film claws 22 and 24 to engage and advance the film only by a single image frame each time a control mechanism is selectively actuated. The embodiment of the present invention cooperates with the defeat mechanism of the projector to selectively disengage pawl 84 from ratchet 78 and cause extensions 96a and 96b to be held in position for restraining film claws 22 and 24 until the advance mechanism is operated in a manner which will be hereinafter described. While the advance mechanism shown and described herein is manually controlled, it will be understood by those skilled in the art that such a mechanism could readily be controlled by other means, such as an electric solenoid or electric motor.

As best shown in FIG. 1, a catch 110 is pivotally secured to the speed slide 50 by any known means such as a rivet 114. Catch 110 is normally urged in a counterclockwise direction about rivet 114 and into contact with pin 115 by a spring 116 which bears against an edge of catch 110 and against a post 118 which is also secured to the slide 50. As is shown in FIG. 2, when catch 110 is held in contact with pin 115 and speed slide 50 is set for single frame operation, end portion 112 of the catch is positioned to be engageable with end portion 88 of pawl 84 as the cam 80 and the pawl 84 are rotated. As catch 110 is contacted by end portion 88, it is effective to cause pawl 84 to become disengaged from ratchet 78 and thereby prevent cam 80 from being driven. When pawl 84 is disengaged in this manner, cam 80 is stopped in a position wherein shaft 94 remains in contact with that portion of cam surface 81 which is not indented so as to maintain end portions 96a, 96b of plate 96 in contact with stud shafts 66 and 68, thereby restraining claw arms 22 and 24 from engaging and advancing the film. Thus, cam surface 81 holds plate 96 in position to permit viewing of the single image frame of the film until catch 110 is caused to release pawl 84 and cam 80 is again rotated in a manner to be hereinafter described.

A bracket 120 is pivotally and slidably mounted on the projector by known means such as the rivet 128 which is secured to a projector through the elongated opening 122 of bracket 120. A peg 130 is secured to the projector and passes through a generally rectangular opening 124 in bracket 120 which is positioned near the end of the bracket 120 opposed to slot 122, and which is thereby effective to limit the travel of bracket 120. As will be explained later in greater detail, bracket 120 is movable in response to movement of both a toggle 138 and the cam surface 81 to cause a single frame of film to be advanced.

A toggle 138 is pivotally mounted to the projector by a pin 146 which extends through an elongated opening 142 such that the toggle is readily accessible by the operator and is manually movable. Toggle 138 is normally urged in a clockwise direction about pin 146 by a spring 144 and is held in the FIG. 1 position until it is manually caused to pivot against the force of the spring 144.

One end of a rod 134 is secured to toggle 138 and the other end of the rod is secured to bent off portion 120a of bracket 120. Although in the embodiment shown, threaded fasteners 136 and 140 are screwed upon the threaded ends of rod 134 to provide adjustment of the travel of bracket 120 and toggle 138, other known fastening means could also be used. Also, it would be possible to substitute a cable or other flexible members for rod 134 if appropriate fasteners are used and if bracket 120 is urged to the right by appropriate spring means.

Referring now in particular to FIGS. 2 and 3, the operation of the single frame mechanism will now be described. As shown in these figures, slide 50 has been moved to the single frame position as indicated by the alignment of the indicator mark on slide 50 with the letter S on the projector. When slide 50 is in this position, the cam followers 28 and 30 are positoned upon the face of cam 40 such that they may contact only a single indentation as cam 40 is rotated. Thus, where cam 40 is driven at 6 revolutions per second, the cam followers would cause either one of the film claws 22 or 24 to engage and advance the film at a rate of 6 frames per second. However, as shown in FIG. 2, when pawl 84 is disengaged from ratchet 78 by catch 110, extensions 96a and 96b contact stud shafts 64 and 66 and drive them under tabs 68 and 70 of the film claws wherein the film claws 22 and 24 are restrained from engaging the film until plate 96 is again moved to the right, thereby permitting viewing of a single image frame.

When the projector mechanism is in the FIG. 2 position, bracket 120 is caused to pivot about in the clockwise direction about rivet 128 until surface 120c of bracket 120 is in contact with the portion of cam surface 81 which is indented. Thus, when toggle 138 is manually pivoted to the left, as shown in phantom, bracket 120 is also moved to the left by rod 134. As end 120b of bracket 120 is brought into contact with catch 110, the catch is moved in a clockwise direction about rivet 114 until end 88 of pawl 84 is released. Spring 92 causes pawl 84 to pivot about post 82 until end 86 is again engaged with ratchet 78.

Once ratchet 78 is engaged by pawl 84, cam 80 is caused to rotate again and, as shown in FIG. 3, post 94 contacts the indented portion of cam surface 81 permitting spring 132 to urge plate 96 to the right. As plate 96 is moved to the right in this manner, extensions 96a and 96b are withdrawn from contact with stud shafts 64 and 66 so as to permit the unrestrained claw arm to engage and advance the film strip by a single image frame. The continued rotation of cam 80 from the FIG. 2 position causes bracket 120 to be pivoted in a counterclockwise direction about rivet 128 as surface 120c is contacted by the enlarged portion of cam surface 81 and the force of spring 132 is overcome. As a result, end 120b of bracket 120 is pivoted away from catch 110 and the catch is then pivoted by spring 116 back into contact with pin 115 wherein it is in position (FIG. 3) to once again engage pawl 84. Thus, even if the operator holds the toggle 138 to the left instead of pulsing the toggle as normally would be done for single frame operation, the stop frame mechanism automatically limits the projector mechanism to advancing a single frame. Of course, as soon as the operator releases the toggle 138, the bracket 120 will again be moved to the FIG. 2 position and in this position is ready to be again operated to cause a single frame to be advanced.

If the operator desires to operate the projector at a speed other than the single frame operation, simply moving speed slide 50 to a position other than that shown in FIG. 2 and 3 causes pawl 110 to be moved from position for end 112 thereof to contact end 88 of pawl 84 and normal operation of the projector can be resumed.

The invention has been described in detail with particular reference to a preferred embodiment thereof, but it will be understood that variations and modifications can be effected within the spirit and scope of the invention.

I claim:

1. In a film transport mechanism having a film claw adapted to intermittently engage and advance a film strip having a plurality of film frames, first cam means adapted to drive said claw to engage and release said film strip, second cam means, ratchet means rotatable about an axis, pawl means coupled to the second cam means and movable into and out of engagement with said ratchet means for driving said second cam means synchronously with said first cam means when the pawl means and ratchet means are engaged, restraining means operatively coupled to the second cam means and positionable relative to the claw by said second cam means into and out of a position for periodically holding said claw ineffective to engage said film strip, the improvement comprising:

means for disengaging the pawl means from the ratchet means when the second cam means has positioned the restraining means in its position for holding the claw ineffective to engage the film strip, thereby effecting prolonged projection of a single frame, said disengaging means comprising a catch mounted for movement between (1) a first position wherein the catch is located with respect to the pawl to disengage the pawl from the ratchet and (2) a second position wherein the catch is disengaged from the pawl, and said disengaging means further comprises means for moving the catch between its first and second positions.

2. In a film transport mechanism having a film claw adapted to engage and advance a film strip, first cam means adapted to drive said claw to engage and release said film strip, second cam means, ratchet means rotatable about an axis, pawl means movable into and out of engagement with said ratchet means for driving said second cam means synchronously with said first cam means when the pawl means and ratchet means are engaged, restraining means operatively coupled to the second cam means and positionable relative to the claw by said second cam means into and out of a position for periodically holding said claw ineffective to engage said film strip, the improvement comprising:

disengaging means shiftable between (1) a first condition wherein said disengaging means is effective to disengage said pawl from said ratchet means, thereby permitting said restraining means to be held by said second cam means in the position wherein said claw is ineffective to engage said film strip and (2) a second condition wherein said disengaging means is ineffective to disengage said pawl and ratchet means; and a shift means coupled to said disengaging means and effective to shift said disengaging means between its first condition and its second condition.

3. The improvement as set forth in claim 2 further comprising:

cycle control means controlled by the second cam and cooperating with said disengaging means in response to movement of the shift means to effect shifting of the disengaging means from its first condition to its second condition, said cycle control means permitting the return of the disengaging means to its first condition from its second condition after advancement of a single film frame and following movement of the first control means to a position for moving the disengaging means to its second condition, whereby said film strip is engaged and advanced only one frame each time said disengaging means is selectively shifted from its second to its first condition.

4. For a motion picture projector or the like, a transport mechanism adapted to selectively advance a motion picture film for stop frame viewing of a single frame of film, said mechanism comprising:

a. first means for periodically advancing said film at a first rate, said means comprising a film claw adapted to be synchronously moved into and out of engagement with said film and to advance said film by a single frame when said film claw is engaged with said film;

b. second means adapted to periodically restrain said first means from advancing said film, thereby effecting advancement of film at a second rate, said second means comprising cam means operable synchronously with said film claw and a ratchet and pawl coupled to the cam means for controlling operation of the cam means, the ratchet and pawl being adapted to be shifted between (1) a first condition wherein said pawl is disengaged from said ratchet so that said ratchet and pawl are thereby ineffective to operate said cam means; and (2) a second condition wherein said pawl is engaged with said ratchet so that said ratchet and pawl are effective to cause said cam means to be operated synchronous with said film claw, and restraining means operable by said cam means for restraining said film claw from movement into engagement with said film;

c. a member adapted to engage said pawl to change said ratchet and pawl from said second condition to said first condition; and
d. means for selectively moving said member between (1) a first position wherein said member is engageable with said pawl and (2) a second position wherein said member is removed a spaced distance from said pawl.

5. In a motion picture projector having a film claw adapted to engage and advance a strip of film, first means to drive said claw into and out of engagement with the film during advancement of an increment of film, second means adapted to restrain said claw from being driven into engagement with the film by said first means, said second means selectively movable between (1) a first position wherein said second means is effective to restrain said claw, and (2) a second position wherein said second means is ineffective to restrain said claw, the improvement comprising:
 a. toggle means movably secured to a first portion of said projector;
 b. bracket means movably secured to a second portion of said projector;
 c. connecting means for connecting said toggle means and said bracket means such that movement of said toggle means produces movement of said bracket means;
 d. catch means for selectively cooperating with said second means to move said second means from said first position to said second position, said catch means being located with respect to said bracket means so that the catch means is controlled by said bracket means in response to movement of said toggle means; and
 e. means for returning said second means from said second position to said first position after said claw has engaged and advanced an increment of film.

6. In a motion picture projector as set forth in claim 5 wherein said returning means comprises cam means which cooperate with said bracket means to move said bracket means from (1) a first position wherein said bracket is ineffective to cooperate with said catch means to (2) a second position wherein said bracket is effective to cooperate with said catch means.

* * * * *